US009782041B2

(12) United States Patent
Baker (10) Patent No.: US 9,782,041 B2
(45) Date of Patent: Oct. 10, 2017

(54) INGREDIENT ATTACHMENT JAR FOR STAND MIXER ATTACHMENT HUB

(71) Applicant: Whirlpool Corporation, Benton Harbor, MI (US)

(72) Inventor: Richard L. Baker, Lewisburg, OH (US)

(73) Assignee: Whirlpool Corporation, Benton Harbor, MI (US)

( * ) Notice: Subject to any disclaimer, the term of this patent is extended or adjusted under 35 U.S.C. 154(b) by 706 days.

(21) Appl. No.: 14/243,957

(22) Filed: Apr. 3, 2014

(65) Prior Publication Data

US 2015/0282672 A1    Oct. 8, 2015

(51) Int. Cl.
| | |
|---|---|
| *A47J 43/00* | (2006.01) |
| *A47J 43/07* | (2006.01) |
| *B01F 15/00* | (2006.01) |
| *B65D 83/00* | (2006.01) |
| *G01F 19/00* | (2006.01) |
| *G01G 19/56* | (2006.01) |

(52) U.S. Cl.
CPC ....... *A47J 43/0727* (2013.01); *A47J 43/0705* (2013.01); *B01F 15/00155* (2013.01); *B65D 83/0083* (2013.01); *G01F 19/00* (2013.01); *A47J 2043/0733* (2013.01); *A47J 2203/00* (2013.01); *G01G 19/56* (2013.01)

(58) Field of Classification Search
CPC ................ B01F 15/023; B01F 15/0234; B01F 15/0235; A47J 43/0727; A47J 2203/00; G01F 19/00; G01G 19/56
USPC .................................................... 366/141, 20
See application file for complete search history.

(56) References Cited

U.S. PATENT DOCUMENTS

| | | | |
|---|---|---|---|
| 501,649 | A | 7/1893 | Fitch |
| 923,248 | A | 6/1909 | Dabney |
| 1,451,759 | A | 4/1923 | Bruhn |
| 2,074,162 | A | 3/1937 | Bowman |
| 2,537,852 | A | 1/1951 | Peterson |
| 2,650,741 | A | 9/1953 | Guilder |

(Continued)

FOREIGN PATENT DOCUMENTS

| | | |
|---|---|---|
| GB | 2435411 | 8/2007 |
| GB | 2436876 | 10/2007 |
| WO | 2010113154 | 10/2010 |

*Primary Examiner* — Tony G Soohoo
*Assistant Examiner* — Anshu Bhatia
(74) *Attorney, Agent, or Firm* — Price Heneveld LLP (57) ABSTRACT

An operable measuring attachment for a mixing appliance includes a mixing bowl defining a mixing interior, a housing having a protrusion attachable to the appliance and a plurality of containers each having an interior volume. Each container is alternatively operable between a measuring position engaged to a top of the housing, and a disengaged position distal from the housing. The operable measuring attachment also includes a magnetic coupler having a first magnetic member disposed proximate the base of each of the plurality of containers and a second magnetic member disposed proximate the top of the housing. The selective magnetic engagement of the first magnetic member of any one of the plurality of containers and the second magnetic members further defines the measuring position. A scale is disposed within the housing that is in communication with the interior volume of the container in the measuring position.

19 Claims, 6 Drawing Sheets

(56) References Cited

U.S. PATENT DOCUMENTS

| | | | |
|---|---|---|---|
| 2,710,098 A | 6/1955 | Tilton | |
| 2,782,012 A | 2/1957 | Coyne et al. | |
| 4,362,219 A | 12/1982 | Carlsson | |
| 4,790,665 A | 12/1988 | Hayashi | |
| 4,887,909 A * | 12/1989 | Bennett | A47J 43/046 |
| | | | 215/12.1 |
| 5,329,069 A | 7/1994 | Amsel et al. | |
| 6,886,972 B2 | 5/2005 | Buchsteiner | |
| 7,598,464 B2 | 10/2009 | Deng | |
| 7,740,400 B2 | 6/2010 | Membreno | |
| 2005/0045671 A1* | 3/2005 | Beesley | A47J 27/004 |
| | | | 222/559 |
| 2005/0122835 A1 | 6/2005 | Nussbaum | |
| 2005/0162971 A1 | 7/2005 | Buchsteiner | |
| 2011/0189358 A1* | 8/2011 | Herbert | A23G 9/045 |
| | | | 426/231 |
| 2012/0026824 A1 | 2/2012 | Gauvin et al. | |

\* cited by examiner

INGREDIENT ATTACHMENT JAR FOR STAND MIXER ATTACHMENT HUB

BACKGROUND

The present device is in the field of measuring mechanisms for appliances, specifically, an operable measuring device for a stand mixer.

SUMMARY

In at least one aspect of the disclosure, an operable measuring attachment for a mixing appliance includes a mixing bowl defining a mixing interior and a housing having an engagement protrusion selectively attachable to the mixing appliance. The operable measuring attachment also includes a plurality of containers each having an interior volume defined by a plurality of sides and a base, where each of the plurality of containers is alternatively operable between a measuring position engaged with a top surface of the housing, and a disengaged position distal from the top surface of the housing. The operable measuring attachment also includes a magnetic coupler having a first magnetic member disposed proximate the base of each of the plurality of containers and a second magnetic member disposed proximate the top surface of the housing. The selective magnetic engagement of the first magnetic member of any one of the plurality of containers and the second magnetic members further defines the measuring position. A scale is disposed within the housing, wherein the scale is in communication with the interior volume of one of the plurality of containers in the measuring position.

In at least another aspect of the disclosure, an operable measuring attachment for a food preparation appliance includes a food preparation zone and at least one container having an interior volume defined by a plurality of sides and a base. The base includes a first magnetic coupler and a housing having an attachment protrusion adapted for selective engagement with the appliance and a second magnetic coupler, and the engagement of the first and second magnetic couplers define a measuring position of any one of the at least one container, and wherein a disengaged position is defined by the disengagement of the first and second magnetic couplers.

In at least another aspect of the disclosure, an operable measuring attachment for a mixing appliance includes an attachment hub and a mixing bowl defining a mixing interior. The ingredient jar includes a plurality of containers each having an interior volume defined by a plurality of sides and a base, wherein the base includes a first magnetic coupler. The ingredient jar also includes a housing having an attachment protrusion adapted for selective engagement with the attachment hub and a second magnetic coupler. The engagement of the first and second magnetic couplers define a measuring position of any one of the plurality of containers, and a disengaged position is defined by the disengagement of the first and second magnetic couplers, and a pouring position is defined by the interior volume of any of the plurality of containers being in communication with the mixing interior.

These and other features, advantages, and objects of the present device will be further understood and appreciated by those skilled in the art upon studying the following specification, claims, and appended drawings.

DETAILED DESCRIPTION OF EMBODIMENTS

Figure 1:
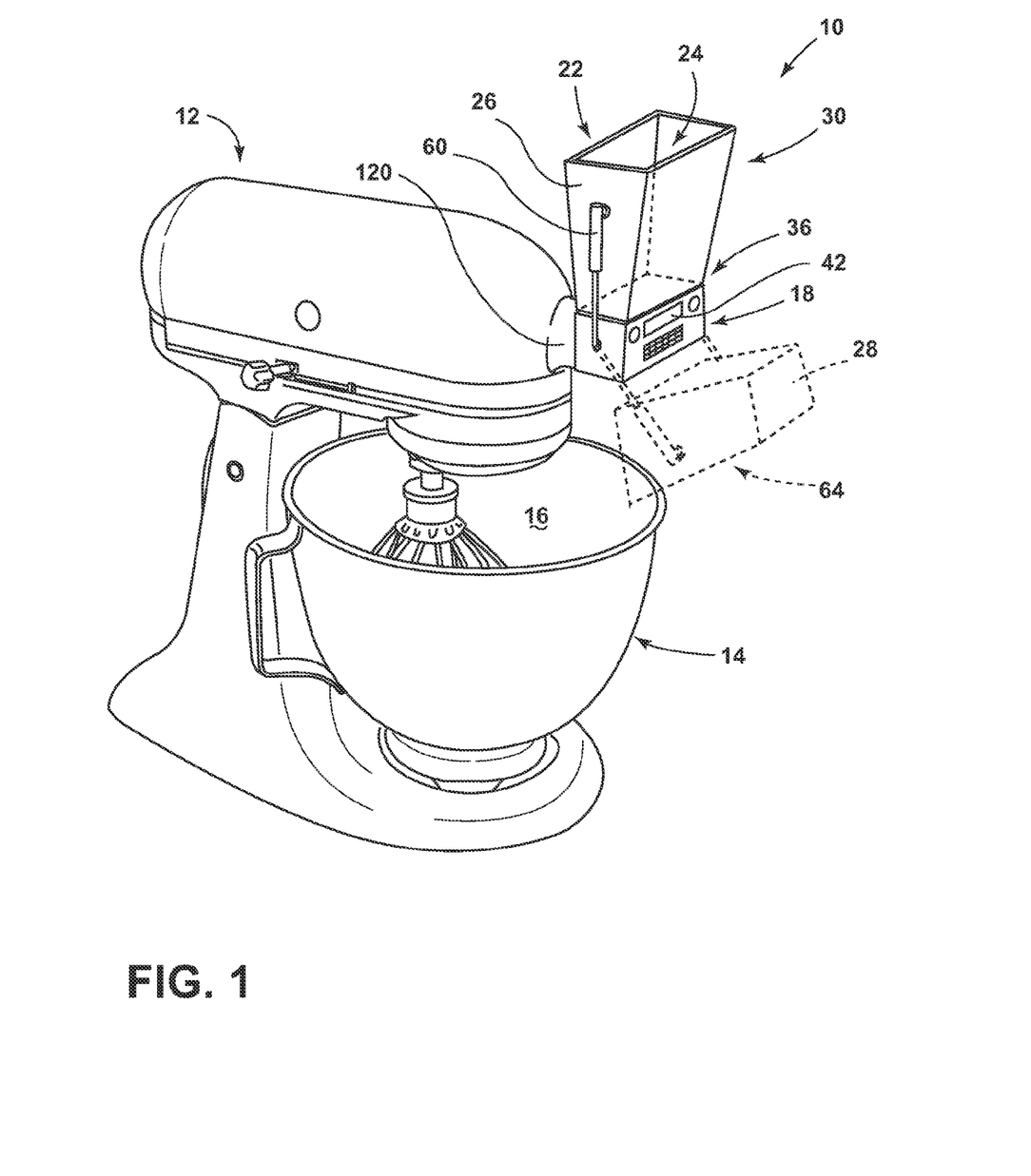
FIG. 1 is a top front perspective view of one embodiment of the operable ingredient jar connected to an appliance.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As illustrated in FIG. 1, reference numeral 10 generally designates an operable measuring attachment 10 for a mixing appliance 12 where the mixing appliance 12 includes a mixing bowl 14 that defines a mixing interior 16. The operable measuring attachment 10 includes a housing 18 having an engagement protrusion 20 that is selectively attachable to the mixing appliance 12. A plurality of containers 22 are also included where each container 22 includes an interior volume 24 that is defined by a plurality of sides 26 and a base 28. Each of the plurality of containers 22 is alternatively operable between a measuring position 30 engaged within a top surface 32 of the housing 18 and a disengaged position 34 distal from the top surface 32 of the housing 18. The operable measuring attachment 10 also includes a magnetic coupler 36 having a first magnetic member 38 that is disposed proximate the base 28 of each of the plurality of containers 22. The magnetic coupler 36 also includes a second magnetic member 40 that is disposed proximate the top surface 32 of the housing 18. The selective magnetic engagement of the first magnetic member 38 of any one of the plurality of containers 22 to the second magnetic member 40 further defines the measuring position 30 of the operable measuring attachment 10. A scale 42 is disposed within the housing 18, wherein the scale 42 is in communication with the interior volume 24 of one container 22 of the plurality of containers 22 that is disposed in the measuring position 30.

Referring now to the embodiments of FIGS. 1-6, the operable measuring attachment 10 can include at least one rotating bar 60 that is selectively and alternatively attachable to any one of the plurality of containers 22. When so engaged, the rotating bar 60 can extend between the housing 18 and the container 22. Such a container 22 that is attached to the housing 18 via the rotating bar 60 can be described as an engaged container 62, wherein the at least one rotating bar 60 coupled to the engaged container 62 is configured to guide the engaged container 62 between the measuring position 30, proximate the top surface 32 of the housing 18, and a pouring position 64. When the engaged container 62 is moved to the pouring position 64, the interior volume 24 of the engaged container 62 is in communication with the mixing interior 16 of the mixing bowl 14 of the mixing appliance 12. In this manner, ingredients contained within the interior volume 24 of the container 22 can be poured into the mixing interior 16 of the mixing appliance 12.

Referring now to the embodiment of FIGS. 1-6, it is contemplated that the rotating bar 60 of the operable measuring attachment 10 is configured to assist in rotating the container 22 to minimize spillage of the contents of each of the containers 22. It is further contemplated that the operable measuring attachment 10 can include two rotating bars 60 that are disposed on the ends 66 of the housing 18 that extend from the ends 66 of the housing 18 up to the sides 26 of each of the containers 22. Where the operable measuring attachment 10 includes a plurality of containers 22, an upper portion 68 of each of the rotating bars 60 can be disengaged from one container 22 such that a different container 22 can be placed in the measuring position 30 and the rotating bar 60 is attached to the second container 124 for the measuring and pouring of ingredients. The replacement of one jar with another can be useful where different ranges of ingredients are to be measured and poured into the mixing interior 16 of the mixing appliance 12, as will be described more fully below. By way of explanation, and not limitation, when preparing a particular recipe, one step of the recipe may call for the measuring and pouring of a large quantity of a particular ingredient, such that a relatively large container 22 of the operable measuring attachment 10 is necessary. A subsequent step in the recipe may call for a relatively small quantity of a different ingredient, such that a large container 22 is unnecessary, or impractical, for measuring the desired amount of the subsequent ingredient. Accordingly, the relatively large container 22 can be detached for the rotating bars 60 and the rotating bars 60 can be reattached to the smaller container 22 for more accurate measurement of the smaller quantity of the subsequent ingredient.

Referring again to the embodiment illustrated in FIGS. 1-6, each of the rotating bars 60 can be configured to be operable between a retracted position 80 and an extended position 82. In such an embodiment, the rotating bar 60 can include the upper portion 68 and a lower portion 84 that are slidably operable relative to one another. Various biasing mechanisms can be installed between the upper and lower members of the rotating bar 60 to bias the rotating bar 60 in either the retracted or extended position 80, 82 depending upon the needs of the user or the design of the operable measuring attachment 10. The operability of the rotating bar 60 between the retracted and extended positions 80, 82 can be used to account for different sizes in the various containers 22 of the operable measuring attachment 10. It is contemplated that containers 22 of varying sizes may have engagement portions 90 for coupling to the rotating bar 60 that include varying distances from the housing 18 when each of the containers 22 of different sizes are placed in the measuring position 30. In such an embodiment, the rotating bar 60 can extend and retract as necessary to couple to the engagement portion 90 of each of the containers 22, regardless of the size of the container 22, to guide the container 22 from the measuring position 30 to the pouring position 64. In this manner, the interior volume 24 of the engaged container 62 can be placed in communication with the mixing zone of the mixing appliance 12 to pour ingredients. Additionally, each engagement portion 90 of the container 22 can include side extensions 130 of varying lengths that are configured to couple to each of the rotating bars 60. The varying lengths of the side extensions 130 can account for differences in width between containers 22 of varying sizes. It is also contemplated that the side extensions 130 can be part of the upper portion 68 of the rotating bars 60 and can include extending mechanisms that allow the rotating bars 60 extend to engage the engagement portions 90 of each of the various containers 22.

In the various embodiments, the biasing mechanism of the rotating bar 60 can be configured to bias the upper portion 68 of the rotating bar 60 toward the retracted position 80 relative to the lower portion 84 of the rotating bar 60. In this manner, when the engaged container 62 is placed in the measuring position 30, and the rotating bar 60 is connected to the engaged container 62, the downward biasing force placed upon the rotating bar 60 is configured to bias the engaged container 62 in a downward direction. Accordingly, the engaged container 62 is held against the top surface 32 of the housing 18 to selectively hold the engaged container 62 against the top surface 32 of the housing 18. It is contemplated that the biasing force of the rotating bar 60 can be an additional feature that is configured to selectively secure the engaged container 62 to the top surface 32 of the housing 18, where the biasing force of the rotating bar 60 acts in addition to the magnetic force of the magnetic coupler 36 of the operable measuring attachment 10.

In various embodiments, it is contemplated that the biasing force of the rotating bar 60 can be the only mechanism for selectively securing the engaged container 62 to the top surface 32 of the housing 18. It is further contemplated that the rotating bar 60 of the operable measuring attachment 10 can include no biasing mechanism and the magnetic coupler 36 provides the only force that pulls the engaged container 62 in a downward direction to selectively couple the engaged container 62 with the top surface 32 of the housing 18 in the measuring position 30. In such an embodiment, the rotating arms are configured for guiding the engaged container 62 between the measuring position 30 and the pouring position 64.

Figure 2:
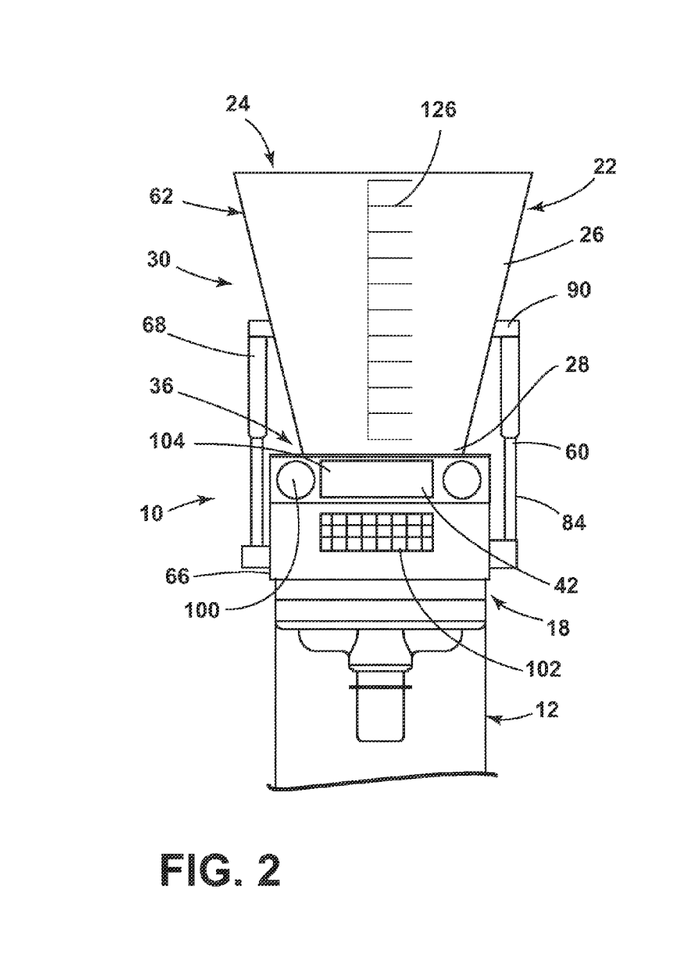
FIG. 2 is a front elevation view of the operable ingredient jar of FIG. 1, placed in the measuring position.
Figure 3:
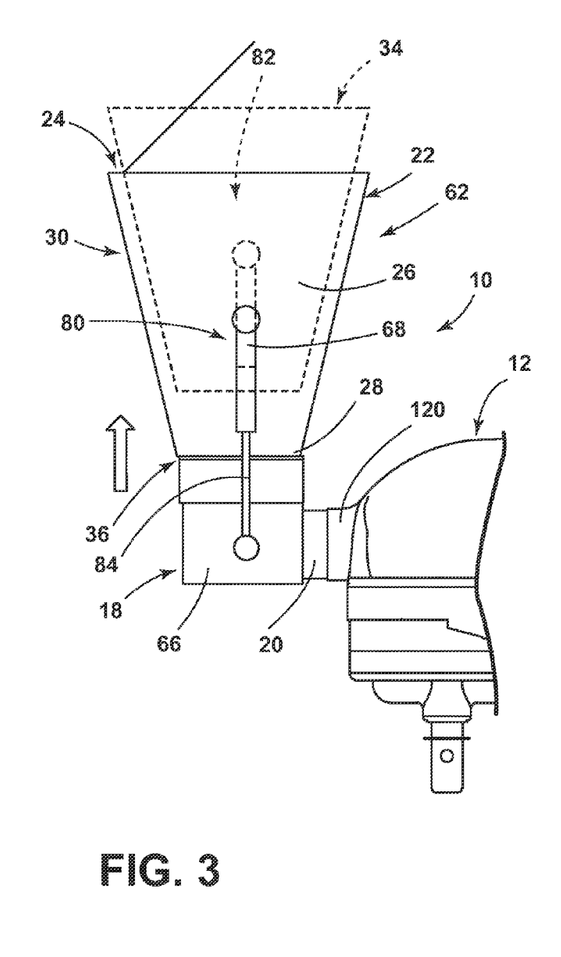
FIG. 3 is a side elevation view of the operable ingredient jar of FIG. 1 with the operable ingredient jar in the measuring position.
Figure 4:
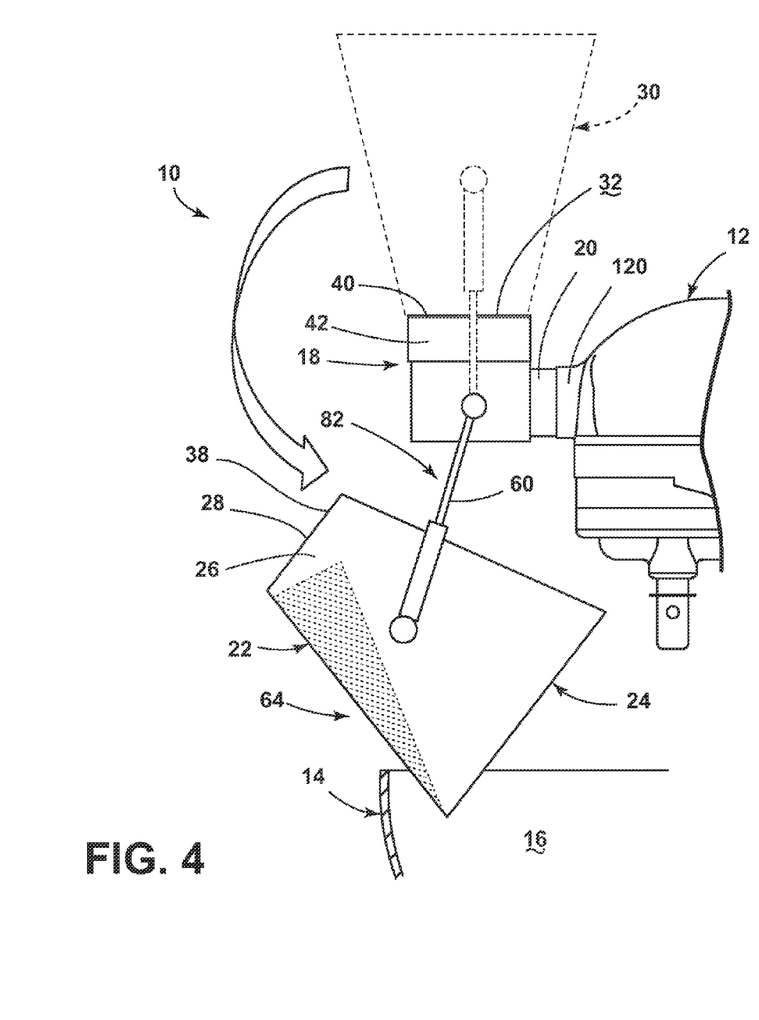
FIG. 4 is a side elevation view of the operable ingredient jar of FIG. 3, with the operable ingredient jar in a pouring position.
Figure 5:
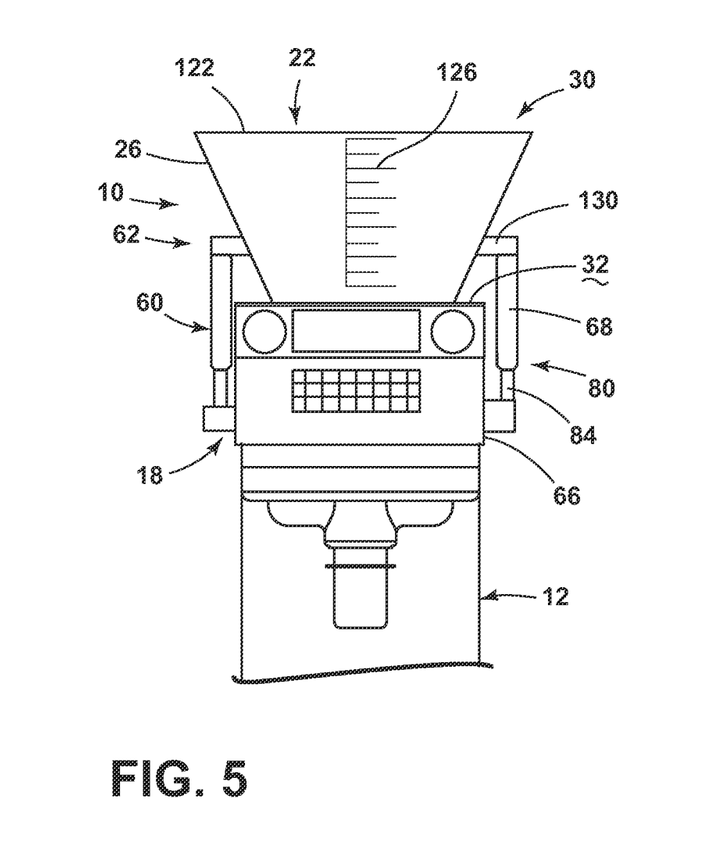
FIG. 5 is a front elevation view of the operable ingredient jar of FIG. 2, with an alternate container installed.
Figure 6:
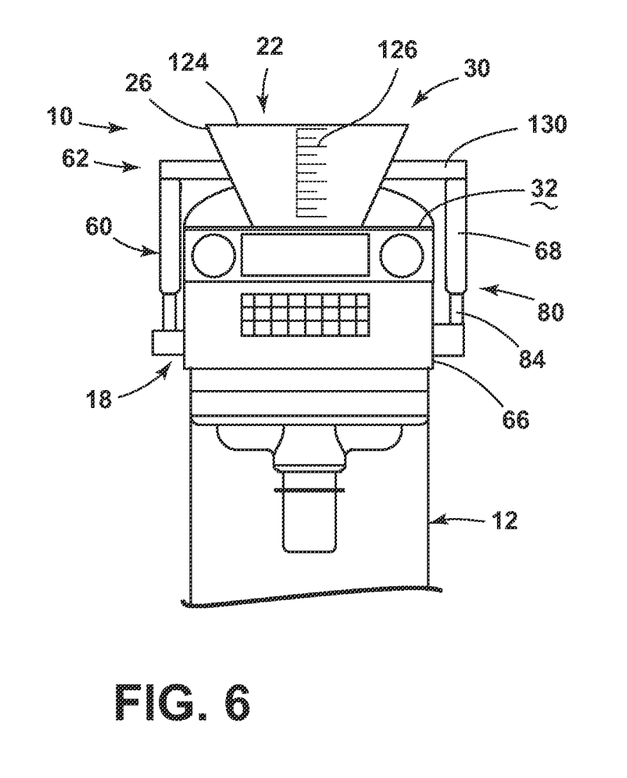
FIG. 6 is a front elevation view of the operable ingredient jar of FIG. 5, with an alternate container installed.

Referring again to the embodiment illustrated in FIGS. 1-3, it is contemplated that the engagement protrusion 20 of the operable measuring attachment 10 is adapted for engagement with an attachment hub 120 of the mixing appliance 12. In the various embodiments, the mixing appliance 12 can include a stand mixer, blenders, food processors, larger commercial mixing appliances, and other food preparation appliances where various ingredients are measured and inserted within a mixing zone of the mixing appliance 12.

In the various embodiments, as illustrated in FIGS. 2-6, it is contemplated that the plurality of containers 22 of the operable measuring attachment 10 can include various containers 22 of differing sizes including first and second measuring containers 122, 124, wherein the first measuring container 122 is larger than the second measuring container 124. It is contemplated that three or more containers 22 of different sizes may be incorporated into the operable measuring attachment 10. By way of explanation, and not limitation, the second container 124 of the operable measuring attachment 10 can have a volume of approximately one cup for relatively small measurements of ingredients. Additionally, the first container 122 can have a volume of a pint, quart, liter, gallon, or other similar volume, such that varying ranges of ingredients can be measured and poured into the mixing area of the mixing appliance 12.

In the various embodiments, as to each of the various containers 22 included in the operable measuring attachment 10, each of the containers 22 can include a plurality of measuring indicia 126 that can include, but are not limited to, etched indicia, applied indicia in the form of ink or appliques, raised indicia, combinations thereof, and other indicia that can inform the user of the operable measuring attachment 10 as to the exact amount of ingredients that are contained within each of the containers 22 for addition to the mixing zone of the mixing appliance 12. The various indicia of the containers 22 can vary depending upon the size of the container 22, wherein a relatively small container 22 can include indicia marking teaspoons, tablespoons, milliliters and/or ounces and other relatively small mass and volumetric measuring increments. Alternatively, larger containers 22 can include greater differentiation in measuring indicia 126, such as cups, pints, liters, quarts, and the like. It is contemplated that the plurality of containers 22 can include measuring indicia 126 to measure English, metric, or other units of measurement.

Referring again to FIGS. 1-6, the container 22 that is disposed in the mixing position on top of the housing 18, being the engaged container 62, is configured to be in communication with the scale 42 of the housing 18. In this manner, as ingredients are disposed within the interior volume 24 of the engaged container 62, the scale 42 is configured to measure weight of the ingredient disposed within the engaged container 62. A user interface 100 disposed on the housing 18 is configured to display the information obtained by the scale 42 to convey to the user the amount of a particular ingredient included within the interior volume 24 of the engaged container 62. It is contemplated that the housing 18 can include a control 102 that it is in communication with the scale 42, wherein the control 102 includes the user interface 100, and wherein the user interface 100 can include at least one function-setting indicia 104. The control 102 can be configured to change the format of the data displayed on the user interface 100. Alternatively, the control 102 can include various functions that include, but are not limited to, a dry ingredient function, wet ingredient function, a function for measuring ingredients that are more viscous and may cling to the side of the engaged container 62. Each of these functions can include a separate indicia on the control 102, such that the user can select one or more functions to measure particular ingredients. The control 102 can also include various functions for changing the units displayed to the user.

Figure 7:
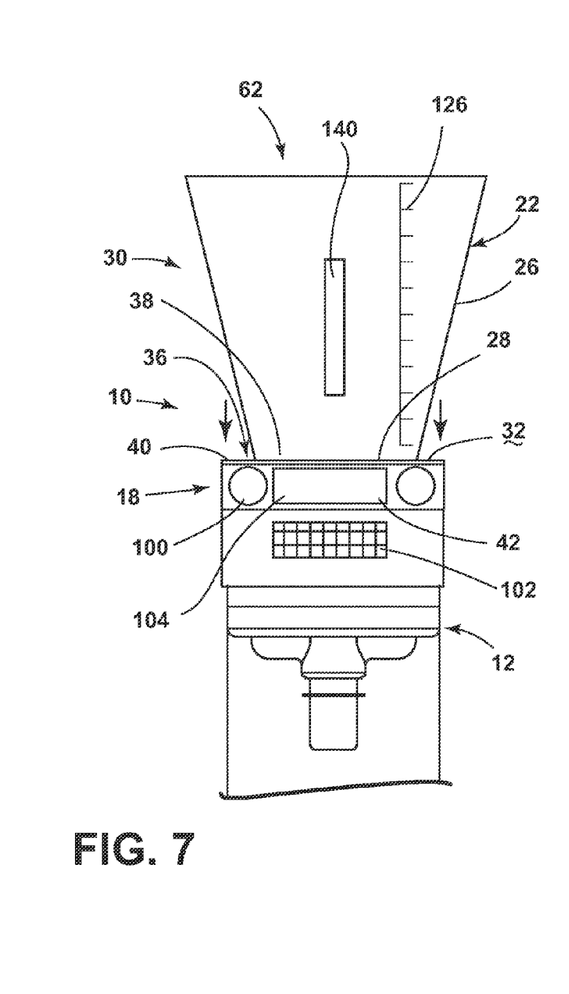
FIG. 7 is a front elevation view of an alternate embodiment of the operable ingredient jar in the measuring position.
Figure 8:
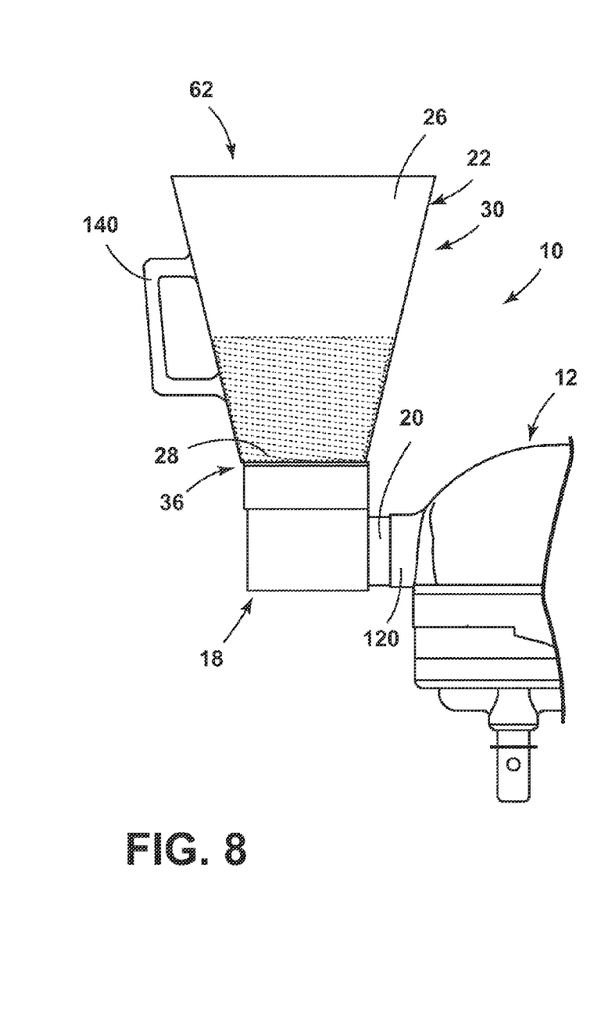
FIG. 8 is a side elevation view of the operable ingredient jar of FIG. 7 in the measuring position.
Figure 9:
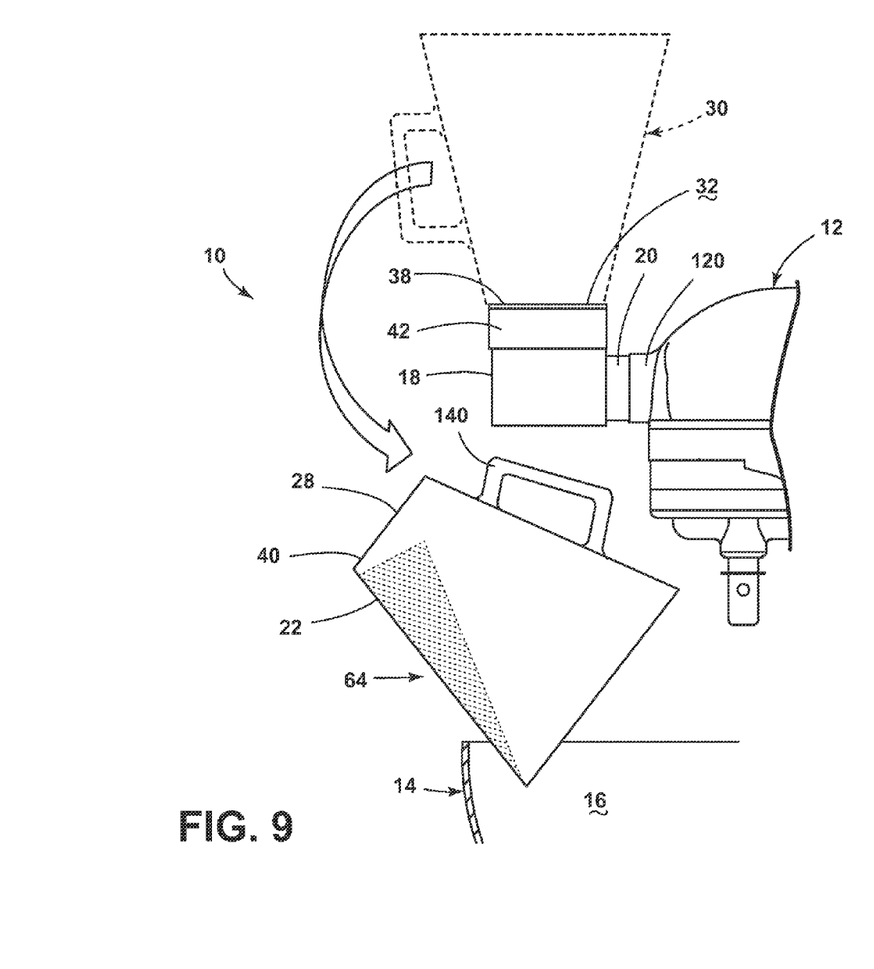
FIG. 9 is a side elevation view of the operable ingredient jar of FIG. 8, with the operable ingredient jar in the pouring position.

Referring now to the embodiment illustrated in FIGS. 7-9, it is contemplated that the operable measuring attachment 10 can include no rotating bars 60 and the container 22 is selectively secured within the measuring position 30 only by the force exerted upon the container 22 by the magnetic coupler 36. In this manner, the first magnetic member 38 disposed in each of the containers 22 is selectively attracted to the second magnetic member 40 disposed proximate the top surface 32 of the housing 18. In this manner, the magnetic attraction between the container 22 in the measuring position 30 and the top surface 32 of the housing 18 serves to selectively retain the container 22 in the measuring position 30. In such an embodiment, the user of the operable measuring attachment 10, after measuring the proper amount of a particular ingredient within the engaged container 62, can simply disengage the engaged container 62 from the housing 18 and pour the ingredients within the interior volume 24 of the engaged container 62 into the mixing zone of the mixing appliance 12. This disengagement can occur by sliding, lifting, tilting, or other disengaging movement.

Referring again to the embodiments of FIGS. 1-9, the first and second magnetic members 38, 40 of the magnetic coupler 36 can both be magnets, such as ferrite magnets, permanent magnets, rare earth magnets, electro magnets, or other similar magnets. It is also contemplated that one of the first and second magnetic members 38, 40 can be a magnet, as described above, and the other of the first and second magnetic members 38, 40 can be a magnetic material, such as a ferromagnetic material, such as iron, cobalt, nickel, or other similar magnetic material. In such an embodiment, the magnet can be disposed in either the housing 18 or each of the containers 22.

In the various embodiments, the user interface 100 of the operable measuring attachment 10 can include various buttons, knobs, switches, touch screens or other selection interface methods. The display of user interface 100 can include an analog display, digital display, or other visual display mechanisms. The user interface 100 can also include an auditory signal that is configured to communicate various information to the user including, but not limited to, information regarding ingredients, the mode or function selected, and other information regarding the status of the operable measuring attachment 10.

Referring now to the various embodiments illustrated in FIGS. 1-9, the operable measuring attachment 10 can include one or more containers 22, where the containers 22 have varying shapes that can include, but are not limited to, rectilinear, curved, and other various shapes. The various containers 22 of the operable measuring attachment 10 can include a truncated shape where a rim of each container 22 includes a larger perimeter than the base 28 of the container 22, such that the rim provides a robust aperture through which ingredients can be disposed into the container 22, while also allowing the surface area of the base 28 to be minimal, such that the housing 18 of the operable measuring attachment 10 can have a minimal matching profile.

In the various embodiments, it is contemplated that each of the containers 22 can include a pour spout, or one or more curved surfaces, that can act as a pour spout to control the flow of various ingredients as they are poured from the interior volume 24 of the container 22 to the mixing zone of the mixing appliance 12. It is further contemplated that each of the containers 22 can include a handle 140 for transporting the containers 22 from one position to another for holding the container 22 while ingredients are poured into the mixing zone of the mixing appliance 12, and other similar purposes.

In the various embodiments, it is contemplated that the operable measuring attachment 10 can include rotating bars 60 that are selectively removable from the housing 18 and the various containers 22, such that the user can select whether to use the operable measuring attachment 10 with or without the rotating bars 60. In such an embodiment, each of the containers 22 and the housing 18 can include an engagement portion 90 that is configured to receive mating engagement members of the rotating bar 60. By way of explanation, and not limitation, a user may desire to utilize the rotating bars 60 when measuring and pouring heavier ingredients, such as liquids and large quantity ingredients. Alternatively, the user may desire to remove the rotating bars 60 from the container 22 and the housing 18 when measuring and pouring lighter or smaller quantity ingredients. The mating engagement of the rotating bar 60 to the engagement portions 90 of the housing 18 in the container 22 can include, but are not limited to, indents and detents, mating protrusions, a protrusion and recess configuration, various mechanical connections such as hooks, clasps, pins, combinations of the above, and other similar mechanical connections.

In the various embodiments, the various containers 22 of the operable measuring attachment 10 can be made of various rigid materials that can include, but are not limited to, ceramic, glass, plastic, metal, combinations thereof, and other similar rigid materials that can be used for measuring ingredients. The interior surface of each of the containers 22 can include a non-stick surface, such that ingredients disposed in the interior surface of the container 22 can be poured out with minimal amounts of the ingredients being left within the interior volume 24 of the container 22.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. An operable measuring attachment for a mixing appliance having a mixing bowl defining a mixing interior, the operable measuring attachment comprising:
    a housing having an engagement protrusion selectively attachable to the mixing appliance;
    a plurality of containers, each having an interior volume defined by a plurality of sides and a base, wherein each of the plurality of containers is alternatively operable between a measuring position engaged with a top surface of the housing, and a disengaged position distal from the top surface of the housing;
    a magnetic coupler having a first magnetic member disposed proximate the base of each of the plurality of containers and a second magnetic member disposed proximate the top surface of the housing, wherein selective magnetic engagement of the first magnetic member of any one of the plurality of containers and the second magnetic member further defines the measuring position;
    at least one rotating bar selectively and alternatively attachable to any one of the plurality of containers, being an engaged container, wherein the at least one rotating bar selectively extends between the housing and the engaged container; and
    a scale disposed within the housing, wherein the scale is in communication with the interior volume of one of the plurality of containers in the measuring position.

2. The operable measuring attachment of claim 1, wherein the engagement protrusion is adapted for engagement with an attachment hub of the mixing appliance.

3. The operable measuring attachment of claim 2,
    wherein the at least one rotating bar guides the engaged container between the measuring position and a pouring position, wherein the interior volume of the engaged container is in communication with the mixing interior.

4. The operable measuring attachment of claim 3, wherein each at least one rotating bar is operable between a retracted position and an extended position, wherein operation of the at least one rotating bar further guides the engaged container between the measuring position and the pouring position.

5. The operable measuring attachment of claim 2, wherein each of the plurality of containers includes a plurality of measuring indicia.

6. The operable measuring attachment of claim 2, wherein the housing includes a control in communication with the scale, wherein the control includes a user interface having at least one function-setting indicia.

7. The operable measuring attachment of claim 2, wherein the plurality of containers includes at least first and second measuring containers, wherein the first measuring container is larger than the second measuring container.

8. An operable measuring attachment for a food preparation appliance having a food preparation zone, the operable measuring attachment comprising:
   at least one container having an interior volume defined by a plurality of sides and a base, wherein the base includes a first magnetic coupler; and
   at least one rotating bar extending between a housing and an engaged container of the at least one container;
   the housing having an attachment protrusion adapted for selective engagement with the food preparation appliance and a second magnetic coupler, wherein engagement of the first and second magnetic couplers define a measuring position of any one of the at least one container, and wherein a disengaged position is defined by disengagement of the first and second magnetic couplers.

9. The operable measuring attachment of claim 8, wherein the housing includes a scale in communication with the engaged container in the measuring position.

10. The operable measuring attachment of claim 9, wherein the attachment protrusion is adapted for engagement with an attachment hub of the food preparation appliance.

11. The operable measuring attachment of claim 10, wherein the at least one rotating bar guides the engaged containers between the measuring position and a pouring position defined by the interior volume of the engaged container in communication with the food preparation zone.

12. The operable measuring attachment of claim 11, wherein each at least one rotating bar is operable between a retracted position and an extended position, wherein operation of the at least one rotating bar further guides the engaged container between the measuring position and the pouring position.

13. The operable measuring attachment of claim 8, wherein the at least one container includes at least first and second measuring containers, wherein the first measuring container is larger than the second measuring container.

14. The operable measuring attachment of claim 8, wherein each at least one container includes a plurality of measuring indicia.

15. The operable measuring attachment of claim 9, wherein the housing includes a control in communication with the scale, wherein the control includes a user interface having at least one function-setting indicia.

16. An operable measuring attachment for a mixing appliance having an attachment hub and a mixing bowl defining a mixing interior, the operable measuring attachment comprising:
   a plurality of containers, each having an interior volume defined by a plurality of sides and a base, wherein the base includes a first magnetic coupler;
   a housing having an attachment protrusion adapted for selective engagement with the attachment hub and a second magnetic coupler, wherein engagement of the first and second magnetic couplers define a measuring position of any one of the plurality of containers, and wherein a disengaged position is defined by disengagement of the first and second magnetic couplers, and a pouring position defined by the interior volume of any of the plurality of containers being in communication with the mixing interior; and
   at least one rotating bar selectively and alternatively attachable to any one of the plurality of containers, being an engaged container, wherein the at least one rotating bar selectively extends between the housing and the engaged container, wherein each at least one rotating bar is operable between a retracted position and an extended position, wherein operation of the at least one rotating bar further guides the engaged container between the measuring position and the pouring position.

17. The operable measuring attachment of claim 16, wherein the at least one rotating bar guides the engaged container between the measuring position and the pouring position.

18. The operable measuring attachment of claim 16, wherein the housing includes a control in communication with a scale disposed in the housing, wherein the control includes a user interface having at least one function-setting indicia.

19. The operable measuring attachment of claim 16, wherein the plurality of containers includes at least first and second measuring containers, wherein the first measuring container is larger than the second measuring container.

* * * * *